Nov. 17, 1942.  G. L. LACSON  2,302,499
SEED PLANTER
Filed Aug. 21, 1941  3 Sheets-Sheet 1
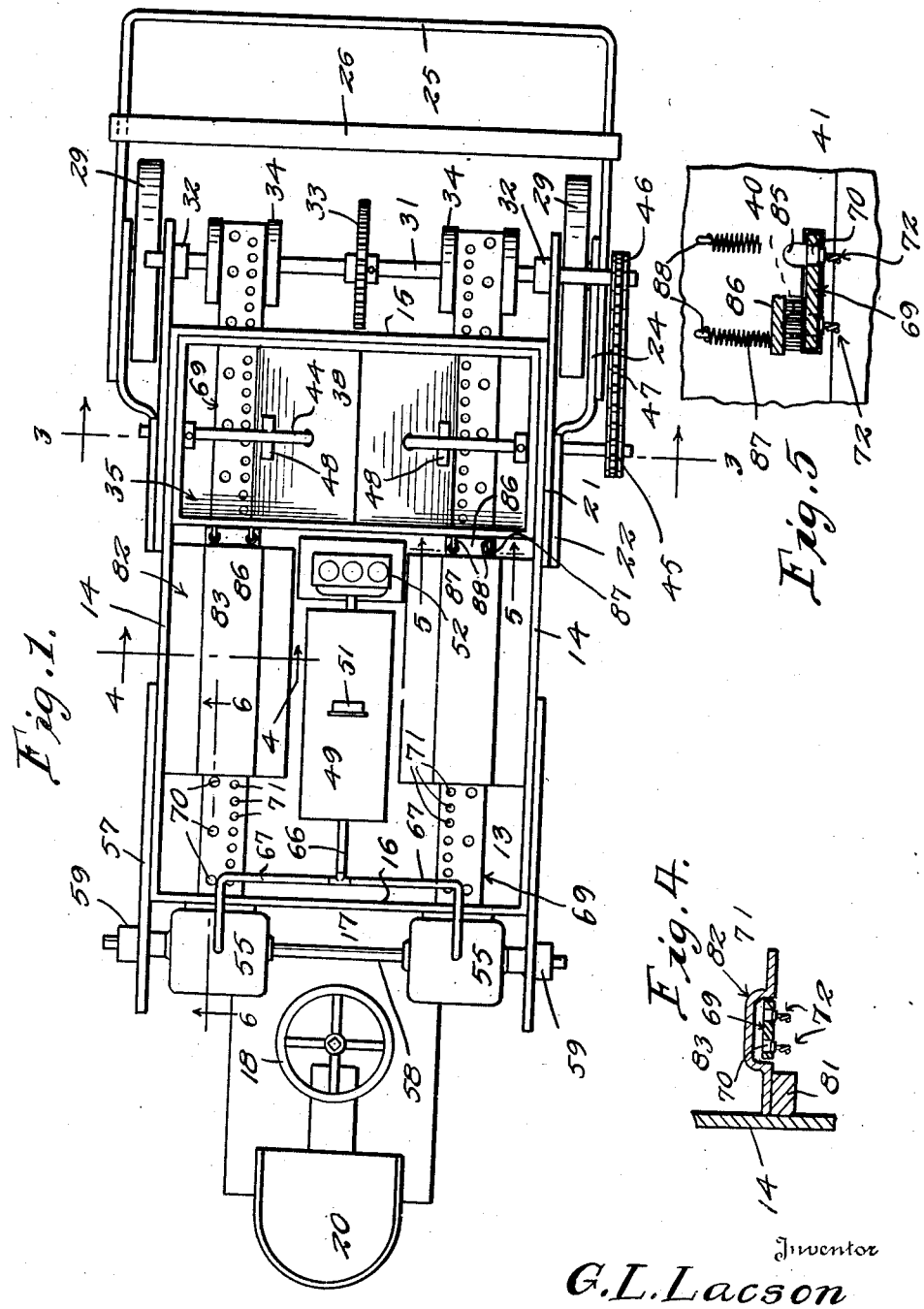
Inventor
G. L. Lacson
By N. F. Randolph
Attorney Nov. 17, 1942.　　　G. L. LACSON　　　2,302,499
SEED PLANTER
Filed Aug. 21, 1941　　　3 Sheets-Sheet 2
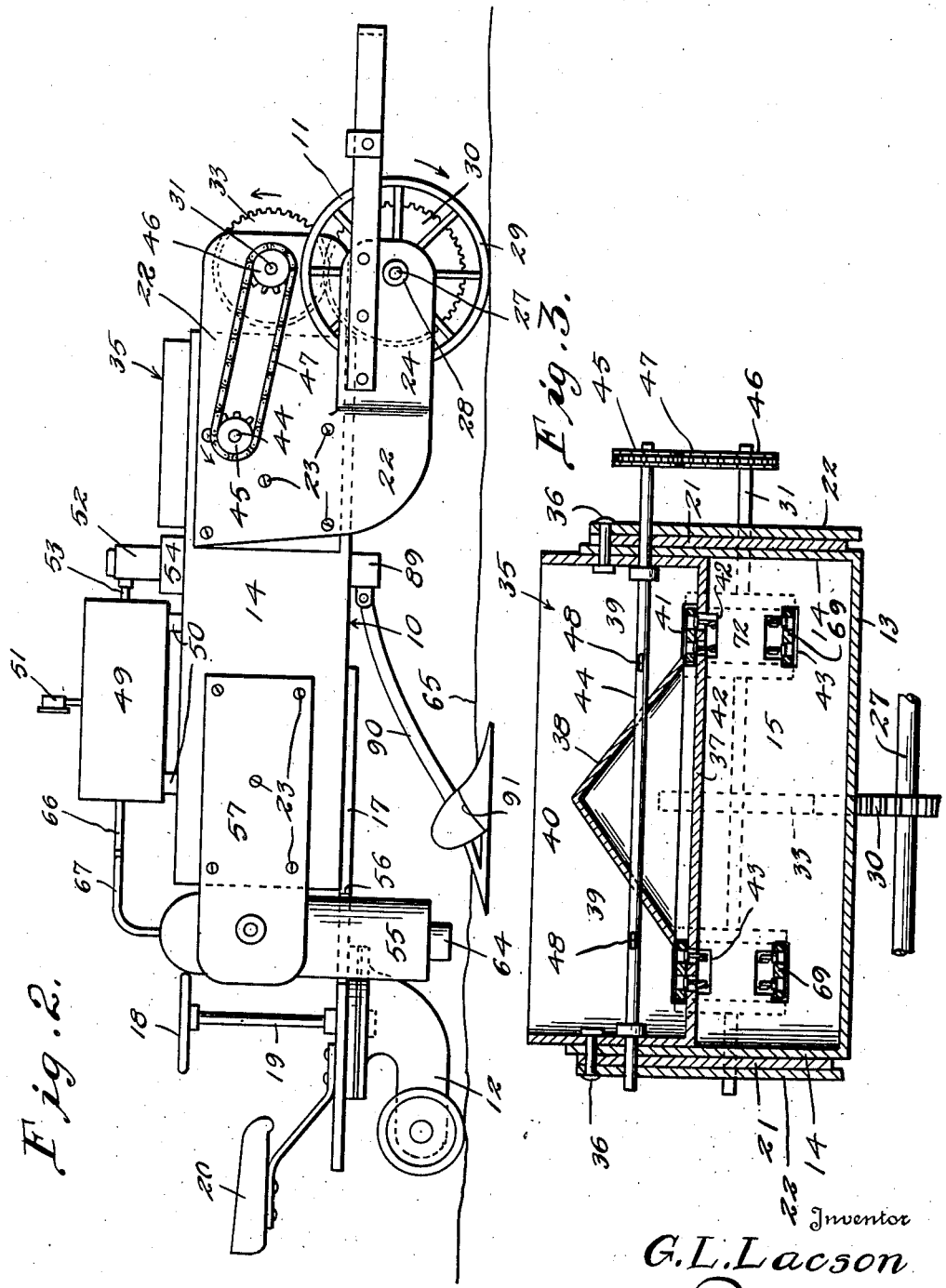
Inventor
G. L. Lacson
By L. F. Randolph
Attorney Nov. 17, 1942.   G. L. LACSON   2,302,499
SEED PLANTER
Filed Aug. 21, 1941   3 Sheets-Sheet 3
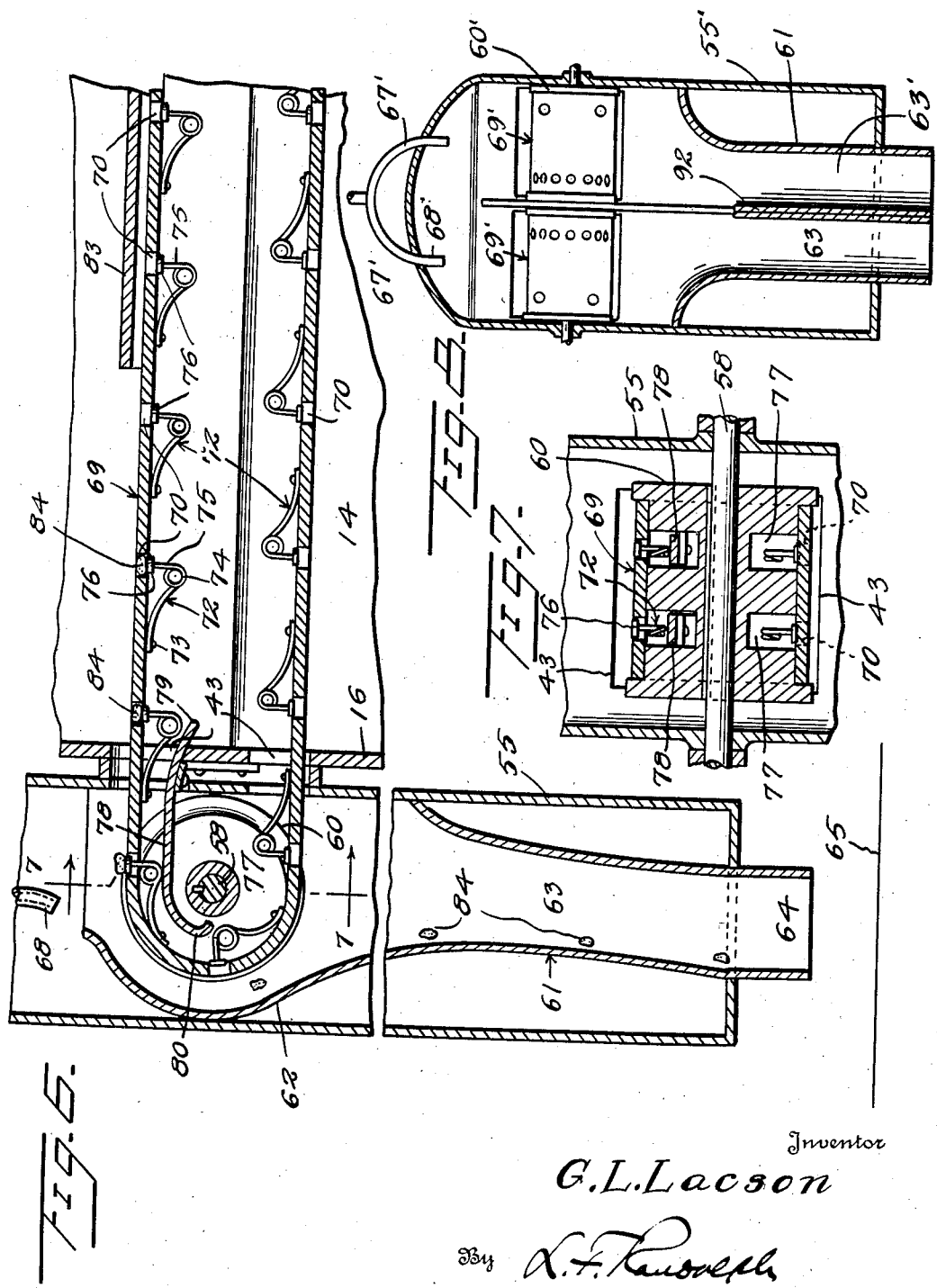
Inventor
G. L. Lacson
By L. F. Randolph
Attorney Patented Nov. 17, 1942

2,302,499

UNITED STATES PATENT OFFICE 2,302,499

SEED PLANTER

George L. Lacson, Mendota, Calif.

Application August 21, 1941, Serial No. 407,815

12 Claims. (Cl. 111—52)

This invention relates to an improved agricultural implement or machine, and more particularly to a machine for planting seeds in one or more rows and at predetermined intervals.

More particularly, it is an aim of the invention to provide a seed planting machine so constructed that regardless of the speed at which the machine is propelled the seeds planted thereby will be substantially equally spaced from one another and spaced the same distance apart irrespective of the speed at which the machine is moving.

More particularly, it is an object of the invention to provide a planter including endless conveyor belts movable through a seed containing hopper and having seed holding means to be filled with seeds while passing through the hopper, and means for ejecting the seeds from the holding means and into receivers from whence the seeds will be discharged onto the surface over which the machine is moving.

Still a further aim of the invention is to provide a machine provided with plows for opening furrows in advance of the discharge of the seeds and in longitudinal alinement therewith so that the seeds will be discharged into the furrows.

Still a further aim of the invention is to provide means for supplying jets of compressed air against the endless conveyors and at substantially the same time that the ejector means are actuated to insure that the seeds will be disengaged from the endless conveyors and propelled toward the discharge openings.

Still a further aim of the invention is to provide means to prevent seeds not contained in the holding means from being carried by the endless conveyor belts outwardly of the hopper for definitely controlling the quantity of seeds that are planted in a furrow of a given length.

Other objects and advantages of the invention will hereinafter become more fully apparent from the following description of the drawings, which illustrate preferred embodiments thereof, and wherein:

Figure 1 is a top plan view of a seed planter constructed in accordance with the invention, Figure 2 is a side elevational view of the same, Figure 3 is an enlarged cross sectional view of the body portion of the machine taken substantially along the plane of the lines 3—3 of Figure 1, Figure 4 is a cross sectional view taken substantially along the plane of the line 4—4 of Figure 1, and on an enlarged scale, Figure 5 is an enlarged cross sectional view taken substantially along the plane of the line 5—5 of Figure 1, Figure 6 is an enlarged, fragmentary longitudinal vertical sectional view taken substantially along the plane of the line 6—6 of Figure 1, Figure 7 is an enlarged fragmentary cross sectional view of a portion of the seeder taken substantially along a plane indicated by the line 7—7 of Figure 6, and Figure 8 is a cross sectional view showing a portion of a slightly modified seeding machine forming a modification of the invention shown in Figures 1 to 7.

Referring more particularly to the drawings, wherein like reference characters designate like or corresponding parts throughout the different views, 10 designates generally a carrier or vehicle having a pair of ground-engaging supporting wheels 11 near the forward end thereof, and a swively mounted castor wheel 12 for supporting the rear end of the carrier 10. The machine 10 includes a bed or bottom 13 having upstanding side walls 14, an upstanding front end wall 15, and an upstanding rear wall 16. A platform 17 is attached to the underside of the bed 13, in any suitable manner, and extends rearwardly therefrom and is adapted to be supported by the castor 12 which is swively connected thereto. A steering wheel 18 is disposed rearwardly of the body of the machine, and is provided with a steering column 19 which is journaled in a bearing of the platform 17 and which is secured to the caster 12 to provide means for steering the machine or carrier 10 from the rear end thereof. A driver's seat 20 is mounted to the rear of the steering wheel 18 and is supported on the platform 17.

A bearing plate 21 is attached to the outer side of each side wall 14 and said bearing plates project forwardly therefrom beyond the forward end of the carrier body. A second bearing plate 22 is attached to the outer side of each side wall 14 and is disposed on the outer side of the bearing plate 21, of the same side of the machine 10. The complementary bearing plates 21 and 22 are attached to the side walls 14 by suitable fastenings, as indicated at 23. The bearing plates 22 are attached at corresponding ends thereof and extend downwardly therefrom below the body of the carrier and are provided with angularly disposed forwardly projecting free ends 24 which are offset outwardly of the secured ends of the plates 22 and which are disposed with a substantial portion thereof below the level of the bottom 13. A U-shaped member 25 has its ends secured to the portions 24 and project forwardly therefrom to provide a hitch by means of which the machine 10 can be attached to a suitable draft vehicle, not shown, such as a tractor. The U-shaped member 25 is preferably provided with a cross brace 26.

An axle 27 is disposed transversely of the machine 10 and is journaled near the ends thereof in bearings 28 which are provided in the plate portions 24. A pair of ground wheels 29 are keyed to the axle 27 and support the forward end of the machine 10. As seen in Figure 1, the ground wheels 29 are disposed between the complementary forward, free ends of the plates 21 and the plate portions 24. A gear 30 is keyed to the axle 27, intermediate of the ends thereof.

A shaft 31 extends through the forward, free ends of the bearing plates 21 and is journaled near the ends thereof in bearings 32 carried thereby. A gear 33 is keyed to the intermediate portion of the shaft 31 and is disposed to mesh with the gear 30 to provide means for driving the shaft 31 from the axle 27 and in the opposite direction thereto. A pair of corresponding pulleys 34 are keyed to the shaft 31, between the gear 33 and the bearings 32, for a purpose which will hereinafter be described.

A hopper, designated generally 35, is mounted in the upper part of the forward end of the carrier body and is disposed transversely thereof and is secured therein by means of a plurality of fastenings 36. The hopper 35 is provided with a substantially flat bottom 37 and with an inverted V-shaped divider 38 which is disposed thereabove and adjacent thereto and which separates the hopper 35 into compartments 39 which are disposed at the ends thereof. The side walls of the hopper 35, designated 40, or in the walls which are disposed forwardly and rearwardly of the machine 10 are provided with alined cut-out portions 41 which open into the compartments 39 and adjacent the bottom 37. The bottom 37 is provided with a pair of elongated openings 42 adjacent each end thereof, as best seen in Figure 3, and which extend longitudinally of the machine 10. The elongated openings 42 of each pair thereof communicate at their ends with complementary cut-out portions 41, for a purpose which will hereinafter be described. The front wall 15 is provided with four corresponding openings 43 which are arranged in pairs, adjacent the ends of the front wall 15 with the openings 43 of each pair disposed in vertically spaced relationship to one another. The upper openings 43 communicate with the cut-out portions 41 of the forward part of the hopper 35 and also with the openings 42 and extend substantially below the bottom 37, as seen in Figure 3, for a purpose which will hereinafter become apparent.

A shaft 44 extends through the hopper 35, transversely of the machine 10 and through the divider 38 and is journaled near its ends in the end walls of the hopper 35, the side walls 14 and the plates 21 and 22. One end of the shaft 44 extends substantially beyond one side of the machine 10 and has a sprocket wheel 45 keyed thereto. The corresponding end of the shaft 31 extends outwardly from the machine 10 and is provided with a similar sprocket wheel 46, which sprocket wheels are connected by a chain 47 to cause the shaft 44 to be driven by the shaft 31. The shaft 44 is provided with agitator blades 48 which project radially therefrom and which are disposed in the compartments 39 and which are adapted to agitate seeds, not shown, which are contained in the compartments 39 of the hopper 35.

A tank 49 for containing compressed air is mounted above the vehicle body on supports 50 which extend into the body and is disposed substantially longitudinally and centrally thereof beyond and spaced from the hopper 35. Tank 49 is preferably provided with an upwardly projecting pressure gage 51. A compressor 52 is mounted between the forward end of the tank 49 and the hopper 35 and is likewise centrally disposed relatively to the machine 10 and is connected by a conduit 53 to the tank 49 for supplying compressed air thereto. The compressor 52 is mounted on a suitable support or post 54 which extends into and is supported by the body of the carrier 10.

Mounted on the machine 10 and rearwardly of the body thereof are two perpendicularly disposed housings or receivers 55 which are disposed in transverse spaced relationship to one another. The receivers 55 are suitably supported on the machine 10 and have their lower ends extending downwardly through openings 56 in the platform 17. A pair of bearing plates 57 are connected one to each of the side walls 14 and on the outer side thereof by means of fastenings 23. The bearing plates 57 extend rearwardly beyond the rear wall 16 and the receivers or housings 55 are disposed between the rear free ends of the plates 57, as best seen in Figure 1. An idler shaft 58 extends through corresponding portions of the receivers 55 and is journaled near the ends thereof in bearings 59 which are carried by the free ends of the plates 57. As seen in Figure 6, a pulley 60 is disposed in each of the receivers 55 and said pulleys are keyed to the shaft 58 and are disposed in longitudinal alinement with the complementary pulleys 34.

Referring to Figure 6, each of the receivers 55 is provided with a funnel shaped member 61 which is disposed therein and which is provided with an outwardly bowed upwardly extending flange portion 62 at the rear thereof which is disposed around and spaced from a part of the complementary pulley 60. The lower portion of the funnel member 61 constitutes a restricted tube 63 which extends downwardly through an opening in the bottom of the receiver 55 and which is provided with an open, lower discharge end 64 which opens downwardly and which is disposed above and near a surface 65 over which the machine 10 is moving. As seen in Figures 1 and 2, a pipe or conduit 66 extends from the tank 49 and is provided with lateral or branch pipes 67 which extend into the upper ends or domes of the receivers 55, and which are provided with free ends or nozzles 68, as seen in Figure 6, which open downwardly and toward the pulleys 60 and which are directed obliquely toward the rear parts of the receivers 55.

An endless conveyor belt 69 is trained over each pair of complementary pulleys 34 and 60, and as best seen in Figure 3, the upper flights of the belts 69 extend through the alined cut-out portions 41, through the compartments 39 and across the upper side of the hopper bottom 37 over which they slide. The rear wall 16 is provided with four openings 43, corresponding to the openings 43 of the front wall 15 and which are disposed to aline therewith, and each of the endless conveyor belts 69 extends through vertically spaced pairs of the openings 43 of the walls 15 and 16, and are arranged to move freely therethrough. Each endless conveyor belt 69 is provided with a series of openings 70 and a series of openings 71, which series of openings are laterally spaced. The individual openings of each series are longitudinally spaced relatively to one another and the spaces between the openings of the series 71 are much less than between the openings of the series 70, for a purpose which will hereinafter become apparent.

Referring to Figure 6, a plurality of springs, each designated generally 72, are mounted on the inner side of each of the belts 69. Each of the springs 72 is fastened at an end thereof by means of a fastening 73 to the inner side of a belt 69, and said springs 72 all extend, from their fastened ends, in the same direction and are curved away from the portion of the belt to which they are connected. Each of the springs 72 is coiled at 74 intermediate of its ends and is provided with a free end 75 which extends upwardly from the coil 74 thereof and which is provided with a head 76 at its terminal which is disposed in an opening of either of the series of openings 70 or 71. The belts 69 are provided with a spring 72 for each opening 70 and 71, and the heads 76 are disposed substantially in the same plane as the inner side of the belt 69 to form a bottom or bed for its openings 70 or 71 and to thereby combine with said openings to form recesses which are adapted to contain seeds. It will be readily apparent that through the gearing 30, 33, when the machine 10 is moving in a forward direction the upper flights of the belts 69 will be moving rearwardly and the lower flights thereof forwardly, and as seen in Figure 6, the springs 72, from their secured ends, extend in a direction opposite to the direction in which the portions of the belts, to which they are connected, are moving. The openings 42 in the bottom 37 are provided to accommodate the springs 72 while the portions of the belts 69, to which they are connected, are moving through the hopper 35. The openings 43 are made sufficiently large to readily accommodate the springs 72. The pulleys 34 and 60 are provided with corresponding annular, outwardly opening grooves or channels 77 to accommodate the springs 72 while the portions of the belts 69, to which they are connected, are moving over said pulleys.

A pair of cam plates or bars 78 is attached to and disposed in each of the upper openings 43 in the rear wall 16. Said cam plates 78 are provided with short downwardly curved ends 79 which extend into the body of the carrier 10 and longer ends which extend into the receivers 55 with one of said longer ends extending into each of the channels 77 of a pulley 60. As seen in Figure 6, the free ends 80 of the plates 78, which are disposed in the channels 77, are curved downwardly and inwardly thereof and terminate at substantially the horizontal center of the pulleys 60. The plates 78 form cam members which are adapted to be engaged by the coils 74 of the springs 72 for forcing said coils upwardly to project the heads 76 upwardly and through their openings 70 or 71 as the portions of the belts to which the springs are connected move into the receivers 55.

Referring to Figures 1 and 4, the side walls 14 are provided with substantially horizontally disposed rails 81 which are suitably attached to the inner sides thereof and to which are connected the outer longitudinal edges of a pair of elongated plates 82 which extend laterally inwardly of the machine 10 and which are provided with upwardly offset longitudinally extending intermediate portions 83 through which the upper flights of the belts 69 move after passing outwardly of the hopper 35 and which provide covers for said upper flights while conveying seeds, as seen at 84 in Figure 6, to the receivers 55. Referring particularly to Figure 5, the wall 40 of the hopper 35 which is disposed at the rear end thereof is provided with openings 85 which open downwardly into the openings 41 and which are disposed above and in alinement with the openings 42. A brush 86 is slidably mounted in any suitable manner on the outer side of said wall 40 and above each of the belts 69 and is held in wiping engagement with its belt 69 by means of expansion coil springs 87 which have their lower ends bearing on the brush 86 and their upper ends engaging against abutments 88. The brushes 86 prevent seeds 84 which are contained in the compartments 39 from being conveyed while on the surfaces of the belts 69 through the openings 85 and out of the hopper 35 and thus provide means for holding the seeds in the openings 85, which are above the series of openings 70 and 71 so that each of the openings 70 and 71 will receive a seed 84 before moving outwardly of the hopper 35.

Referring to Figure 2, the bed 13 is provided with a pair of laterally spaced depending brackets 89 to which are pivotally connected plow standards 90 which extend rearwardly and downwardly therefrom and which support plow blades 91 at the opposite ends thereof. The plow blades 91, only one of which is illustrated, are each disposed in front of and in longitudinal alinement with a discharge outlet 64 and said plow blades 91 are adapted to form a furrow in the surface 65, in a conventional manner, so that the seeds 84 which are discharged through the outlets 64, as will hereinafter be explained, will drop into the furrows, not shown, thus formed.

Assuming that the hopper 35 is filled with seeds 84 and that the member 25 is attached to a suitable draft vehicle, as the carrier 10 is moved forwardly the ground wheels 29 will turn in a clockwise direction, as seen in Figure 2, for imparting a counterclockwise rotation to the gear 33, shaft 31 and the shaft 44 to thereby cause the upper flights of the endless conveyors 69 to move rearwardly of the machine and to cause the blades 48 to be revolved for agitating the seeds in the hopper compartments 39, not shown. As the openings or recesses 70 and 71 move through the compartments 39 a seed will be lodged in each and said seeds will be pressed downwardly into said openings or recesses by engagement with the brushes 86 as the openings 70 and 71 pass therebeneath. The seeds thus held will be conveyed rearwardly by the belts 69 and into the receivers 55. As the seeds 84 are moved into the receivers 55, as seen in Figure 6, the springs 72, as previously explained, will engage the cam plates 78 for projecting the heads 76 upwardly to eject the seeds 84 from the openings 70 and 71 and after the seeds are thus ejected and supported by the heads 76 and as the heads, which are thus projected, begin to move downwardly around the pulleys 60 the seeds supported thereby will be brought into the path of the jets of compressed air from the nozzles 68 to cause the seeds 84 to be blown off of the heads 76 and away from the belts 69 and for directing the seeds downwardly through the tube portions 63 to be discharged into the furrows formed by the plows 91. After the seeds have been thus ejected and discharged from the heads 76 the springs 72 move out of engagement with the ends 80 of the cam members 78 and return, by their own resilience, to their normal positions with the heads 76 retracted inwardly of the openings 70 and 71. It will thus be readily apparent that the seeds 84 will be discharged through the tube portions 63 at regulated intervals to be dropped into the furrows at regularly spaced intervals which will be like distances apart regardless of the speed at which the machine 10 is moving. While the springs 72 would ordinarily be sufficient to discharge the seeds 84 from the belts 69, many types of seeds, which are capable of being planted by the machine 10, are very light and have hair-like protuberances which tend to cling to the heads 76 and to the belts 69 and in order to insure that these seeds will be discharged from the belts and at proper intervals the jets of air from the nozzles 68 are provided. It will be understood, that a jet of air will be discharged continuously through the nozzles 68 while the machine is in operation, and that suitable means, not shown, may be provided for shutting off the flow of air through the pipes 67.

Obviously, if desired, one of the sets of openings 70 or 71 can be omitted, and if desired only a single endless conveyor belt 69 can be provided, or, more than two belts could be employed, as required. The machine 10 is particularly designed and adapted for planting cotton seeds, beet seeds and lettuce seeds and the openings of the series 71 are intended to carry culture seeds, which can later be thinned out, if necessary or which can supplement the seeds carried by the openings 70 as where the last mentioned seeds do not mature in whole or in part.

In Figure 8 a slightly modified form of the invention is disclosed, wherein the endless conveyor belts 69' are arranged close together and wherein the other parts associated therewith are similarly moved to corresponding, adjacent positions. In this modified form, instead of providing two separate receivers a single receiver 55' is provided having a funnel member 61' which is provided with a central dividing wall 92 which extends from the bottom thereof to form two corresponding tube-like passages 63' and which extends upwardly between the pulleys 60' and the belts 69'. In this form of the invention, the laterals 67' both extend into the dome of the receiver 55' and are arranged so that their nozzles 68' are directed toward the two belts 69' and are disposed one on either side of the partition 92. In view of the detailed description and showing of the preferred form of the invention, illustrated in Figures 1 to 7, a further description of the modification, shown in Figure 8, is considered unnecessary, as the operation thereof will be identical with the operation of the machine previously described as the only difference in the result accomplished will be that the seeds will be planted in rows that are closer together.

Various modifications and changes are contemplated and may obviously be resorted to, provided they fall within the spirit and scope of the invention as hereinafter defined by the appended claims, as only preferred embodiments of the seed planter have been disclosed.

I claim as my invention:

1. A seed planter comprising a wheeled carrier provided with a supporting frame, a shaft journaled in said frame and adjacent the forward end thereof, gear means for connecting said shaft to a ground wheel of the carrier to cause the shaft to be driven thereby in the opposite direction to the ground wheel, a housing member mounted adjacent the opposite, rear end of the carrier, a shaft journaled in the carrier frame and extending through and turnably mounted in said housing, pulleys keyed to said shafts and disposed in longitudinal alinement, an endless conveyor belt trained over said pulleys and driven by the pulley of the first mentioned shaft when the carrier is moved, said housing being provided with openings in one wall thereof through which the endless conveyor is movable, a hopper mounted on said frame and adapted to contain seeds to be planted, the upper flight of said endless conveyor passing through said hopper, and means formed in the endless conveyor and adapted to receive seeds while passing through the hopper for conveying the seeds rearwardly and into the housing and for discharging the seeds into the housing, and said housing being provided with an opening in the bottom portion thereof through which the seeds are adapted to pass by gravity onto a surface over which the carrier is moving.

2. A planter as in claim 1, comprising means for conveying air under pressure to the housing for propelling the seeds from the endless conveyor and toward the housing outlet.

3. A seeder as in claim 1, comprising a funnel shaped member disposed in the housing and having a restricted lower portion opening downwardly and outwardly of the housing and an enlarged upper portion in which said endless conveyor is movable and into which the seeds are discharged.

4. A seeder as in claim 1, said means for holding the seeds in the endless conveyor including a plurality of longitudinally spaced openings formed in the endless conveyor, a plurality of resilient elements attached to the inner side of the conveyor, each of said resilient elements being attached at an end thereof to the conveyor and being provided with a headed, free end disposed in the opening and adjacent the inner side of the conveyor to combine with the opening to form a recess for holding the seeds, and cam means disposed in said housing and arranged to engage said spring members for projecting the free ends thereof outwardly of the openings for ejecting the seeds therefrom and into the housing.

5. A seeder as in claim 1, said means for holding the seeds in the endless conveyor including recesses formed in the conveyor and adapted to contain the seeds, and cam actuated ejector means for ejecting the seeds outwardly of said recesses and while the recesses are passing through the housing.

6. A seeder as in claim 1, said means for holding the seeds in the endless conveyor including recesses formed in the conveyor and adapted to contain the seeds, cam actuated ejector means for ejecting the seeds outwardly of said recesses and while the recesses are passing through the housing, and blower means for blowing the ejected seeds off of the endless conveyor and downwardly toward the discharge opening of the housing.

7. A seeder as in claim 1, comprising wiper means disposed adjacent to and associated with the hopper for wiping seeds from the endless conveyor to prevent seeds not contained in the holding means of the conveyor from passing therewith outwardly of the hopper.

8. A seeder as in claim 1, comprising an agitator for agitating the seeds in the hopper and including a shaft journaled in the hopper and connected to and driven by said first mentioned shaft.

9. A seeder as in claim 1, comprising a plow attached to the carrier and disposed therebeneath for opening a furrow in the surface over which the carrier is moving, said plow being disposed forwardly of and in longitudinal alinement with the discharge opening of the housing to form a furrow into which the seeds from the housing are directed.

10. A seed planter comprising a carrier, a driven endless conveyor mounted on said carrier and movable relatively thereto, a hopper adapted to contain seeds to be planted, the upper flight of said endless conveyor being movable through said hopper, the endless conveyor having longitudinally spaced openings for receiving seeds from the hopper, means supported on the inner side of the endless conveyor and having portions extending into the openings for supporting the seeds in the openings, a receiver in which an end of the endless conveyor is movably mounted, means for engaging the seed supporting means for projecting said portions thereof through the conveyor openings for discharging the seeds into the receiver, and said receiver being provided with a discharge opening in the bottom thereof to and through which the seeds are adapted to be conveyed by gravity to be discharged at spaced intervals onto the surface over which the carrier is moving.

11. A seed planter comprising a carrier, driven endless conveyor belts movably mounted thereon, each of said conveyor belts being provided with laterally spaced sets of seed holding means, each of said sets of seed holding means extending the length of the belt, a hopper mounted on the carrier and through which the upper flights of the belts are movable, said hopper being adapted to contain seeds, and said sets of holding means being adapted to be filled with the seeds while passing through the hopper, receivers in which corresponding ends of the endless conveyors are disposed and into which the upper flights of the endless conveyors are movable after passing through the hopper, means associated with the conveyor belts and receivers for ejecting the seeds from the holding means of the endless conveyor belts into the receivers, and discharge openings in the bottoms of said receivers and through which the seeds are adapted to drop onto the surface over which the carrier is moving.

12. A seeder as in claim 11, the seed holding means of said belts including openings formed in the belts, and said last mentioned means including ejectors carried by the belts for supporting the seeds in the openings, and cam actuating means disposed in the receivers for engaging and actuating the ejector means to cause the ejector means to eject the seeds from the belts and into the receivers.

GEORGE L. LACSON.